United States Patent [19]

Noguchi et al.

[11] 3,968,782

[45] July 13, 1976

[54] TORCH IGNITION TYPE INTERNAL COMBUSTION ENGINE WITH A RESTRICTED ORIFICE

[75] Inventors: Masaaki Noguchi, Nagoya; Takashi Kato, Susono, both of Japan

[73] Assignee: Toyota Jidosha Kogyo Kabushiki Kaisha, Toyota, Japan

[22] Filed: Dec. 19, 1974

[21] Appl. No.: 534,584

[30] Foreign Application Priority Data

July 31, 1974 Japan.............................. 49-87799

[52] U.S. Cl............................. 123/191 S; 123/32 K; 123/32 SP; 123/191 SP
[51] Int. Cl.²..................... F02B 19/12; F02B 19/18
[58] Field of Search......... 123/32 ST, 32 SP, 32 SA, 123/32 K, 32 L, 191 S, 191 SP, DIG. 4

[56] References Cited

UNITED STATES PATENTS

| | | | |
|---|---|---|---|
| 2,103,787 | 12/1937 | McCrary............................ | 123/191 S |
| 2,708,428 | 5/1955 | Fisher................................ | 123/191 S |
| 3,363,611 | 1/1968 | VonSeggern et al. ........ | 123/191 S X |
| 3,572,298 | 3/1972 | Onishi et al...................... | 123/32 ST |
| 3,921,605 | 11/1975 | Wyczalek......................... | 123/191 S |

FOREIGN PATENTS OR APPLICATIONS 520,597   4/1940   United Kingdom........... 123/191 SP

*Primary Examiner*—Charles J. Myhre
*Assistant Examiner*—William C. Anderson
*Attorney, Agent, or Firm*—Stevens, Davis, Miller & Mosher

[57] ABSTRACT

A torch ignition type internal combustion engine with no intake valve in the auxiliary combustion chamber, the engine comprising: a cylinder; a cylinder head; a reciprocating piston snugly received in said cylinder; a main combustion chamber defined between said cylinder head and piston and having an intake valve and an exhaust valve to control intake and exhaust ports in the cylinder head; an auxiliary combustion chamber provided in the cylinder head; an arcuately curved passage interconnecting said main and auxiliary combustion chambers; and an ignition plug mounted on the cylinder head with its sparking electrodes located in a circumferential portion of said arcuately curved passage.

4 Claims, 2 Drawing Figures

TORCH IGNITION TYPE INTERNAL COMBUSTION ENGINE WITH A RESTRICTED ORIFICE

BACKGROUND OF THE INVENTION

1. Field of the Invention

This invention relates to improvements in a torch ignition type internal combustion engine which has no intake valve in the auxiliary combustion chamber.

It is well known in the art that to burn a rather lean air-fuel mixture in an engine cylinder is quite effective to reduce the toxic components such as carbon monoxide, unburned hydrocarbons and nitrogen oxides which are usually present in the exhaust gas. A lean air-fuel mixture, however, has potentially inferior ingnitability and low flame propagation velocity, compared to those of rich mixture, therefore it is crucially important for an engine which burns a lean air-fuel mixture to stabilize the ignitability and to increase its flame propagation velocity, otherwise poor thermal efficiency and/or toxic exhaust gas would result.

2. Description of Prior Art

In order to overcome the aforementioned difficulties, there has been introduced the so-called torch ignition type internal combustion engine which has a main combustion chamber with an intake valve and an exhaust valve, and an auxiliary combustion chamber with an auxiliary intake valve, the engine being adapted to supply a lean air-fuel mixture to the main combustion chamber and a relatively rich mixture to the auxiliary combustion chamber through the respective intake valves. In such an engine system, the relatively rich air-fuel mixture in the auxiliary combustion chamber is first ignited and burned, the flame bursting out from the auxiliary combustion chamber successively ignites the lean air-fuel mixture in the main combustion chamber. This internal combustion engine with an auxiliary intake valve in the auxiliary chamber has its own merit and demerit, that is, it improves the ignitability since a rich air-fuel mixture is initially ignited by a spark plug and the high flame propagation velocity is resulted by the strong torch flame. On the other hand, such internal combustion engine inevitably requires extra parts such as an auxiliary intake valve in the auxiliary combustion chamber and the complicated mechanism for operating the auxiliary valve.

The present inventors have previously proposed a torch ignition type internal combustion engine which comprises a main combustion chamber with an intake valve and an exhaust valve, an auxiliary combustion chamber with no intake valve, a passage interconnecting the main and auxiliary combustion chambers, and an ignition plug having its sparking electrodes located in a position contiguous to the interconnecting passage. In this torch ignition type internal combustion engine, a lean air-fuel mixture sucked into the main combustion chamber through the intake valve during the intake stroke of the piston is pushed into the auxiliary combustion chamber during the succeeding compression stroke through the passage interconnecting the main and auxiliary combustion chambers. In this engine, a relatively lean air-fuel mixture can be ignited since there is only fresh air-fuel mixture around the sparking electrode of the ignition plug, that is, there is no residual gas remaining around the electrode at the time of ignition, because the residual gas in the above mentioned passage has been flown into the auxiliary combustion chamber by fresh mixture during compression stroke.

In the above-described torch ignition type internal combustion engine with no intake valve in the auxiliary combustion chamber, it is however, more desirable to have richer air-fuel mixture around the sparking electrodes of the ignition plug in order to have more ensured ignitability under any operating conditions of the engine.

SUMMARY OF THE INVENTION

It is an object of the present invention to provide a torch ignition type internal combustion engine which has no intake valve in the auxiliary combustion chamber and which can improve the ignitability of the lean air-fuel mixture and ensure stabilized ignition and combustion under any operating conditions of the engine.

It is another object of the present invention to provide a torch ignition type internal combustion engine of the nature mentioned above, which is adapted to supply local rich air-fuel mixture around the sparking electrodes of the ignition plug to improve the ignitability of the air-fuel mixture in the auxiliary combustion chamber.

Still another object of the invention resides in the provision of a torch ignition type internal combustion engine of the type mentioned above, which effectively eliminates the disadvantages encountered with the prior art of constructions.

It is a further object of the invention to provide a torch ignition type internal combustion engine which is simple in construction and reliable in operation.

According to the present invention, there is provided a torch ignition type internal combustion engine which has no intake valve in the auxiliary combustion chamber said engine comprising a cylinder; a cylinder head; a reciprocating piston snugly received in said cylinder, a main combustion chamber defined between the head of said cylinder and said piston and having an intake valve and an exhaust valve to control intake and exhaust ports in the cylinder head; an auxiliary combustion chamber, having a volume smaller than that of the main combustion chamber, provided in the cylinder head; an arcuately curved passage interconnecting said main and auxiliary combustion chambers; the cross-sectional area of the passage being smaller than that of the auxiliary combustion chamber and an ignition plug mounted on the cylinder head with sparking electrodes located in a circumferential portion of said arcuately curved passage.

The above and other objects, features and advantages of the present invention will become clear from the following particular description of the invention and the appended claims, taken in conjunction with the accompa nying drawings which show by way of example one preferred embodiment of the invention.

PARTICULAR DESCRIPTION OF THE INVENTION

Figure 1:
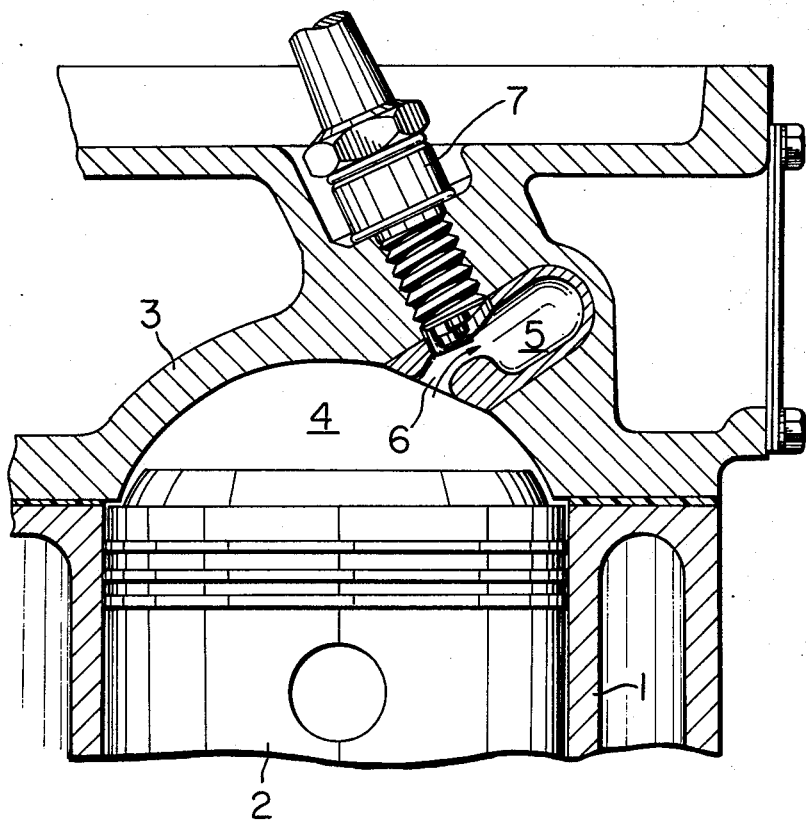
FIG. 1 is a sectional view diagrammatically showing the torch ignition type internal combustion engine according to the present invention.

Referring to the accompanying drawings and first to FIG. 1, the torch ignition type internal combustion engine according to the present invention includes a cylinder 1 and a piston 2 which is snugly received in the cylinder 1 for reciprocating movement therein in the well known manner. A main combustion chamber 4 is defined between the end face of the piston 2 and the head 3 of the cylinder 1. The main combustion chamber 4 is provided with an intake valve and an exhaust valve, not shown, for the induction of air-fuel mixture and discharge of exhaust gases, respectively. An auxiliary combustion chamber 5 is provided in the cylinder head 3 and is in communication with the main chamber 4 through an arcuately curved passage 6. The passage has its two ends opening to the main combustion chamber and auxiliary combustion chamber and the walls of said passage at said two ends are connected smoothly with the inner walls of said main and auxiliary combustion chambers respectively. An ignition plug 7 has its sparking electrodes positioned in a outer circumferential portion of the arcuately curved passage 6.

Figure 2:
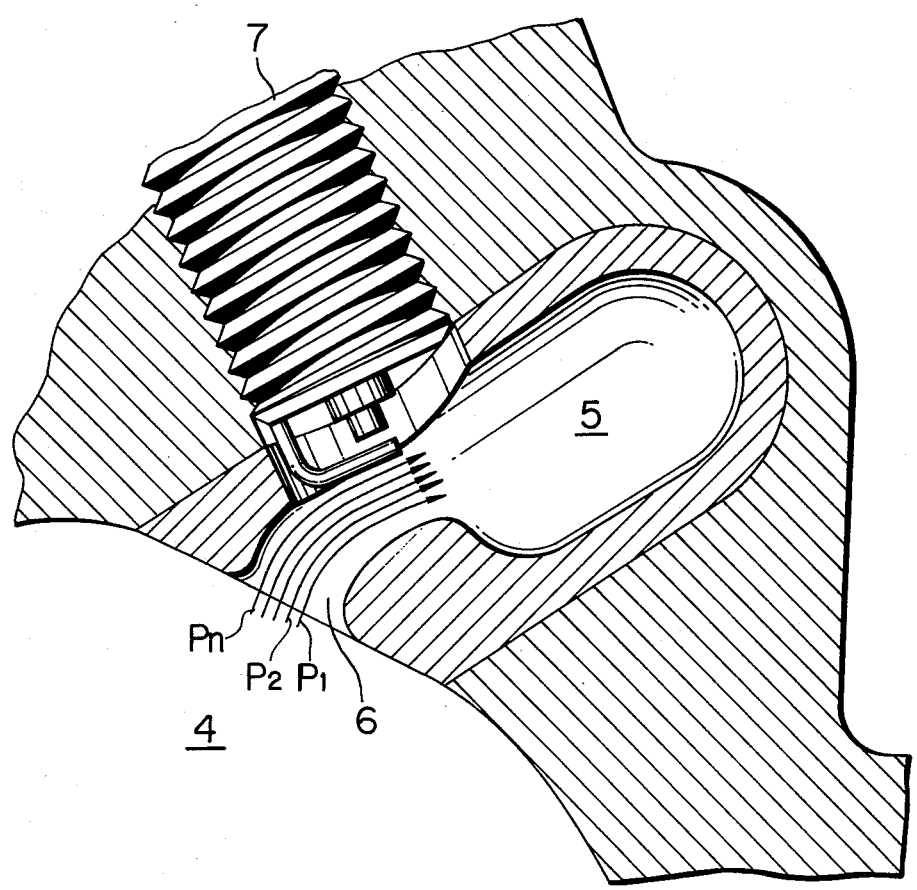
FIG. 2 is a sectional view showing on an enlarged scale the streams of the air-fuel mixture flowing through the passage interconnecting the main and auxiliary combustion chambers of the engine of FIG. 1.

The operation of the internal combustion engine with the construction as described above is now explained with reference to FIGS. 1 and 2. A lean air-fuel mixture is sucked into the cylinder 1 or the main combustion chamber 4 through an intake valve, not shown, during the intake stroke of the piston 2. During the succeeding compression stroke, the lean air-fuel mixture is pushed through the passage 6 into the auxiliary combustion chamber 5 smoothly as a result of the increased pressure within the main combustion chamber 4 and the smooth connection of walls at the boundary of the passage and main combustion chamber. Due to the curvature of the passage 6, the air-fuel mixture is forced to follow the arcuate passage 6 forming streamlines as indicated at $P_1$, $P_2$, ... $P_n$ in FIG. 2. While passing through the arcuate passage 6, the fuel particles which have a relatively higher specific gravity are thrown toward the outer circumferential portions of the passage 6 by the centrifugal force, so that the mixture becomes richer in the streamline $P_n$ which runs along the outer circumferential wall of the passage 6. As the sparking electrodes of the ignition plug 7 is located in the outer circumferential portion of the passage 6 where fuel concentration is richest as just described, ignitability of the air-fuel mixture in the auxiliary combustion chamber can be improved to a considerable degree. Furthermore, the curved passage serves to induce secondary blow, not shown, to the air-fuel mixture, thus enhancing the evaporation of the fuel.

It will be clear from the foregoing description that, according to the invention, it is possible to obtain a torch ignition type internal combustion engine with no intake valve in the auxiliary combustion chamber which can improve the ignitability to such a degree as would contribute to enhance the operational efficiency of the engine and to reduce the fuel consumption and unburned hydrocarbon contents in the engine exhaust gas.

What is claimed is:

1. A torch ignition internal combustion engine of the type which has no intake valve in the auxiliary combustion chamber, said engine comprising:
   a cylinder;
   a reciprocating piston snugly received in said cylinder;
   a main combustion chamber defined between the head of said cylinder and said piston and having an intake valve and an exhaust valve to control intake and exhaust ports in the cylinder head;
   an auxiliary combustion chamber, having a volume smaller than that of the main combustion chamber, provided on the cylinder head;
   an arcuately curved passage interconnecting said main and auxiliary combustion chambers, and the cross-sectional area of the passage is made sufficiently small to ensure sufficient velocity of flow therethrough; and
   an ignition plug mounted on the cylinder head with its sparking electrodes located in a circumferential portion of said arcuately curved passage.

2. A torch ignition internal combustion engine as defined in claim 1, wherein said auxiliary combustion chamber and said arcuately curved passage are formed integrally with each other and fixedly secured to the cylinder head.

3. A torch ignition internal combustion engine as defined in claim 1, wherein the wall of said passage at the end opening to the main combustion chamber connects smoothly with the inner wall of said main combustion chamber.

4. A torch ignition internal combustion engine of the type which has no intake valve in the auxiliary combustion chamber, said engine comprising:
   a cylinder;
   a reciprocating piston snugly received in said cylinder;
   a main combustion chamber defined between the head of said cylinder and said piston and having an intake valve and an exhaust valve to control intake and exhaust ports in the cylinder head;
   an auxiliary combustion chamber, having a volume smaller than that of the main combustion chamber, provided on the cylinder head;
   an arcuately curved passage interconnecting said main and auxiliary combustion chambers, and the cross-sectional area of the passage is smaller than that of the auxiliary combustion chamber; and
   an ignition plug mounted on the cylinder head with its sparking electrodes located in a circumferential portion of said arcuately curved passage.

* * * * *